(No Model.) 5 Sheets—Sheet 1.

L. D. McINTOSH.
STEREOPTICON.

No. 439,420. Patented Oct. 28, 1890.

Witnesses:
O. W. Bond
E. Jeffrey Smith

Inventor
Lyman D. McIntosh (No Model.)
L. D. McINTOSH.
STEREOPTICON.
No. 439,420.
5 Sheets—Sheet 2.
Patented Oct. 28, 1890.
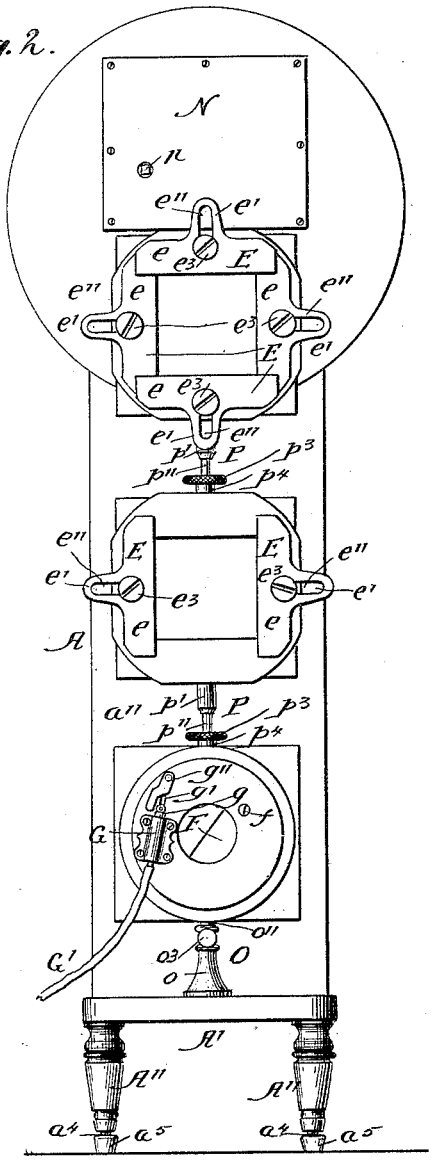
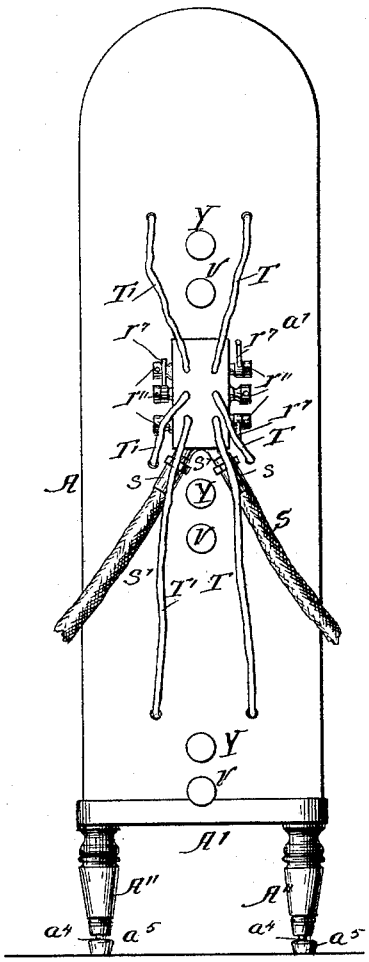
Witnesses:
O. W. Bond
Alfred Smith
Inventor:
Lyman D. McIntosh (No Model.)  L. D. McINTOSH.  5 Sheets—Sheet 3.
STEREOPTICON.
No. 439,420.  Patented Oct. 28, 1890.
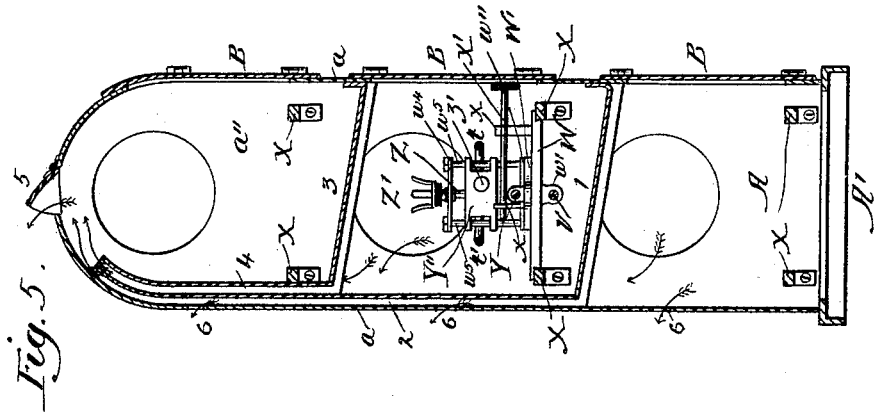
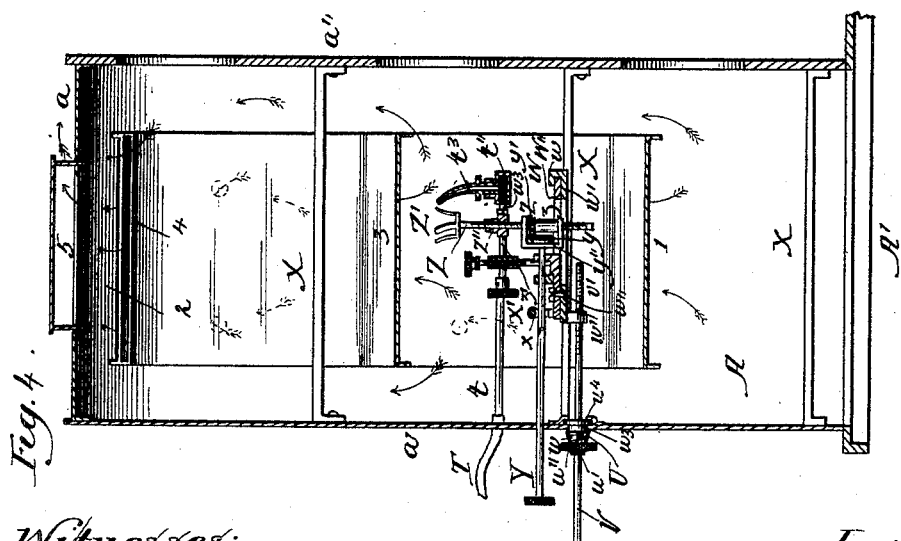
Witnesses:  Inventor:
Lyman D. McIntosh (No Model.) 5 Sheets—Sheet 4.
L. D. McINTOSH.
STEREOPTICON.
No. 439,420. Patented Oct. 28, 1890.
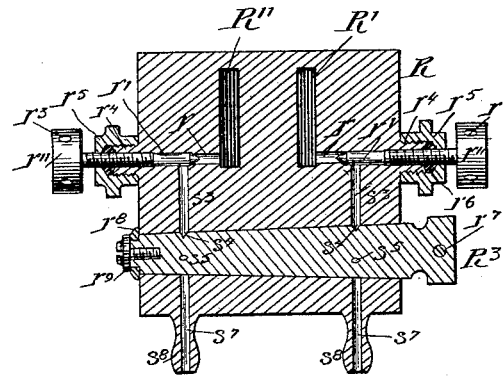
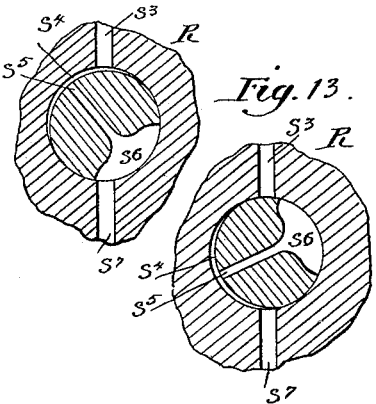
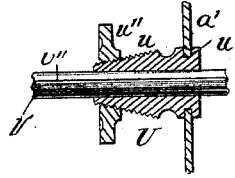
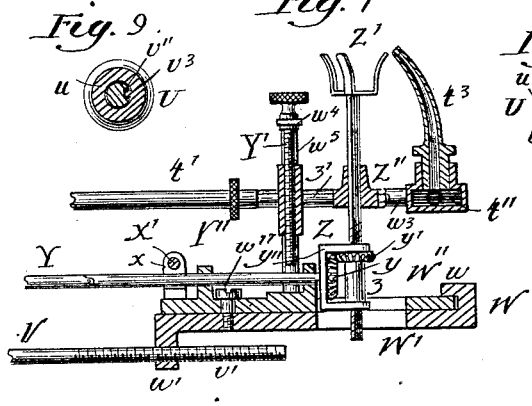
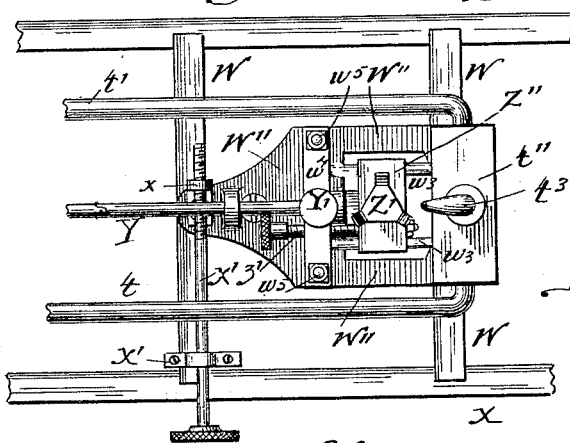
Witnesses:
Inventor:
Lyman D. McIntosh (No Model.) 5 Sheets—Sheet 5.

L. D. McINTOSH.
STEREOPTICON.

No. 439,420. Patented Oct. 28, 1890.

Witnesses:

Inventor:
Lyman D. McIntosh

THE NORRIS PETERS CO., PHOTO-LITHO., WASHINGTON, D. C.

UNITED STATES PATENT OFFICE.

LYMAN D. McINTOSH, OF CHICAGO, ILLINOIS.

STEREOPTICON.

SPECIFICATION forming part of Letters Patent No. 439,420, dated October 28, 1890.

Application filed December 4, 1889. Serial No. 332,596. (No model.)

*To all whom it may concern:*

Be it known that I, LYMAN D. MCINTOSH, a citizen of the United States, riding at Chicago, in the county of Cook and State of Illinois, have invented certain new and useful Improvements in Stereopticons; and I do hereby declare that the following is a full, clear, and exact description of the invention, which will enable others skilled in the art to which it pertains to make and use the same, reference being had to the accompanying drawings, forming a part hereof, in which—

Figure 1:
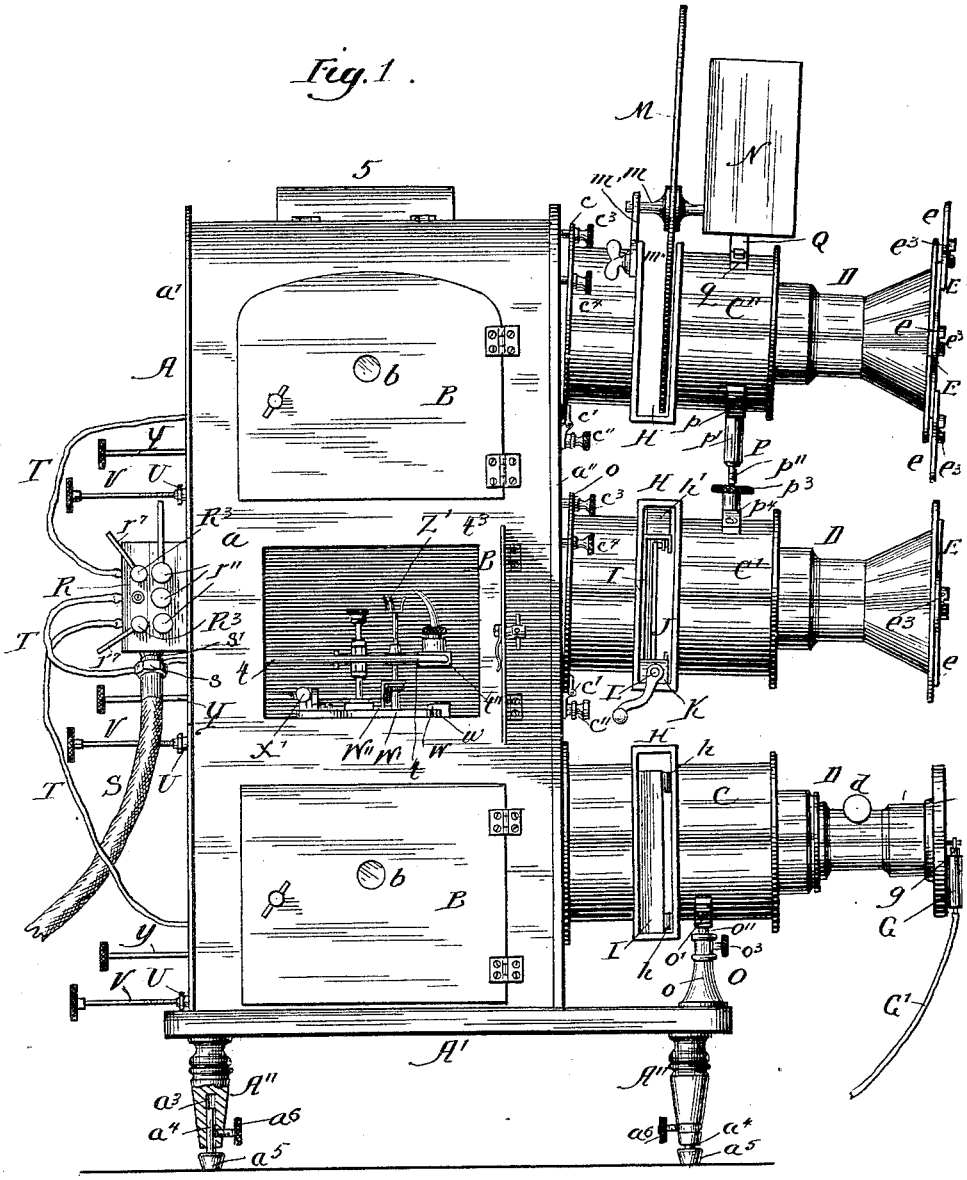
Figure 15:
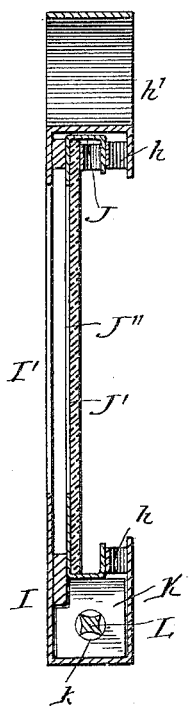
Figure 14:
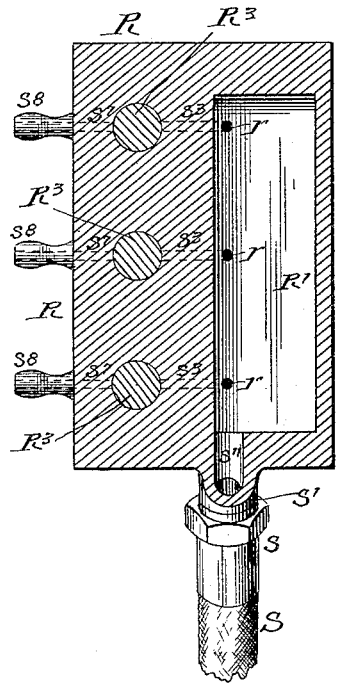
Figure 16:
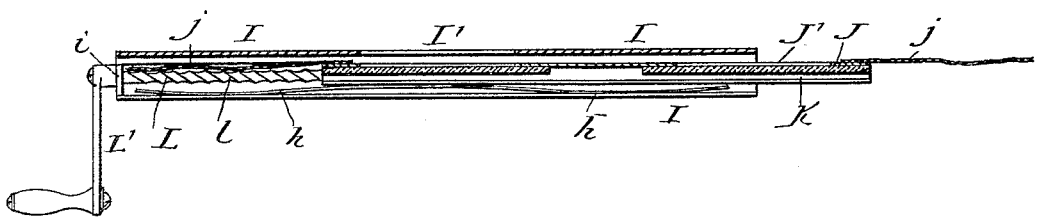

Figure 1 is a side elevation with the supply-tubes broken off. Fig. 2 is a front end elevation. Fig. 3 is a rear end elevation. Fig. 4 is a longitudinal section with the lens-tubes and appliances removed and with the key removed. Fig. 5 is a cross-section showing the frame and adjusting devices for the lime. Fig. 6 is a top or plan view of the frame and adjusting devices for the lime. Fig. 7 is a longitudinal section of the parts shown in Fig. 6. Fig. 8 is a detail in section, showing one of the adjusting-rods and the clamping-nut therefor. Fig. 9 is a cross-section through the adjusting-rod and the clamping-nut. Fig. 10 is a cross-section of the clamping-nut. Fig. 11 is a cross-section of the key. Figs. 12 and 13 are details in section, showing different positions of the key-plug. Fig. 14 is a longitudinal section of the key. Fig. 15 is a sectional elevation of one of the frames carrying the pictures. Fig. 16 is a detail, partly in section, showing the device for traveling the picture in the frame of Fig. 15.

This invention relates to a stereopticon more especially designed for displaying transparent pictures or objects by projecting them on a screen, and in which three lights are employed for the purpose of projecting three varieties of pictures on the same screen for illustrating different effects—such as cloud or water effects, moving figures, and the flash of lightning, or other similar illustrative transparencies or pictures; but some of the devices are applicable to and can be used with a single light for producing a single transparency or picture.

The objects of the invention are to produce the effects of the several pictures on the same screen and in such union one with the other as to properly illustrate the intended effect, and have the projection of the several different transparencies or figures on the screen at one and the same time, or have each effect produced independent of the other, and have such effect varied in its design by turning the light down, or shading the effect, or turning the light up so as to be brighter and produce a denser effect at the will of the operator, and this without cutting down the pressure of the gas on the valves; to improve the several devices by which the scenic effect is produced; to improve the devices by which the transparencies are actuated or moved, so as to blend them and have the picture clear and clean; to improve the projection of the transparency on the screen, by which a sharp outline of the horizon or borders can be blended to produce in effect with moving figures when appearing on the screen as though they came out of the other projected picture, instead of the effect ordinarily produced, which is that of passing an open space and coming suddenly into view; to improve the devices by which a portion of the marginal rays can be cut off to produce a square or circular effect on the screen instead of a cone-shaped, as would be the case in the ordinary use of a three-light lantern; to improve the devices by which the flow of gas is controlled and allow the gas from high-pressure cylinders to be turned on at full pressure without affecting the light; to improve the devices by which the several jets or lights can be controlled independent one of the other without reducing the pressure on the controlling-valves; to improve the devices for adjusting the light; to improve the means for ventilating the lantern and allowing the hot air and products of combustion to escape, so as to keep the front of the lantern cool and prevent injurious effects from the heat on the lenses, and to improve generally the construction and operation of the several devices which enter into the construction of the lantern as a whole, and thereby improve the operation of the lantern; and its nature consists in the several parts and combinations of parts hereinafter described, and pointed out in the claims as new.

In the drawings, A represents the case in which are located the jets, and on which are mounted the lens-tubes and the key for the gas, which case is formed of a body portion $a$, a rear end $a'$, and a front end $a''$, made of sheet metal or other suitable material, and of a sufficient height to contain three jets or lights and support three lens-tubes at the front end.

B are doors by which access is had to the jets and the frame and adjusting devices for the jets, and each door is provided with an opening $b$, closed by a glass or other transparent material by which an inspection of each jet can be had without opening the door. Each door is suitably hinged to the body $a$ on one side of the case A, and each door is provided with a handle by which the door can be opened and closed and locked when closed. The case A is attached to a base A', which base is supported upon four legs A''—one at each corner—and each leg A'' has therein a hole $a^3$ to receive a spindle $a^4$, on the end of which is a head $a^5$, and each spindle $a^4$ is locked by a thumb-screw $a^6$, so that by loosening the thumb-screw the leg A'' can be raised or lowered, and when at the proper point can be locked in that position by setting the thumb-screw onto the spindle $a^4$, as shown in Fig. 1. It will thus be seen that each leg can be adjusted independent of the other, and the legs at either the front or rear end of the base A' can be raised or lowered, as may be required to adjust the lantern, and when adjusted the base can be held in its adjusted position by simply locking the spindles $a^4$ with the set-screws $a^6$.

C C' C'' are the lens-tubes, each of which is cylindrical in cross-section, as usual, and each of which has at its front and rear ends a plate or disk. The tube C is attached to the end wall $a''$ by the disk or rim $c$ in any suitable firm manner, and the tubes C' and C'' are each attached to the end wall $a''$ by the disk or rim $c$ and a hinge $c'$, which hinge is on a plate attached to the wall $a''$ by a thumb-screw $c''$, and the attachment is completed by means of thumb-screws $c^3$ and $c^4$, one of which $c^3$ is entered into the wall $a''$ and the others $c^4$ are made to abut against the end wall $a''$, and two thumb-screws $c^4$ are used, one for each side of the tube. The thumb-screws $c^4$ are adjusted in or out, as required, to abut against the wall $a''$, and the thumb-screws $c^3$ are adjusted in or out, as required, to set the tubes C' C'' at the proper inclination.

D are adjustable tubes for setting the lenses, a tube D being provided for the tubes C C' C'', as usual, and the tube D for the lower light has an adjusting-screw $d$, as usual.

E are shutters mounted on the outer face of the upper and middle tube D, four shutters being provided for the upper tube and two for the middle tube in the arrangement shown. Each shutter E is formed of a plate $e$, with a side projecting ear $e'$, in which is a slot $e''$, through which passes the shank of a set-screw $e^3$, which screw enters the end wall or ring of the tube D. Each shutter E can be turned or adjusted to have its body $e$ stand straight or at an inclination, as may be required for the projection of the transparency, by simply loosening the set-screw $e^3$ and moving the shutter E and turning it to the desired position and then locking the shutter in its adjusted position by setting down the set-screw $e^3$, and such adjustment is permitted by the slot $e''$ in each shutter.

F are shutters for closing the opening in the outer end of the lower tube D, and these shutters are made in the form of half-circles, coming together when closed at the center of the opening, as shown in Fig. 2, and each shutter is pivoted by a suitable pin or pivot $f$, so as to be free to open and close.

G is an air-cylinder attached to the end plate or wall of the lower tube D, and having attached thereto a tube $g'$, extending back to a bulb or other device, by means of which air can be supplied to the cylinder G. The cylinder G has therein a piston $g$, attached to a stem $g'$, which is connected to a lever or arm $g''$, attached to the shutters F, so that by moving the piston $g$ the arm or lever $g''$ will be operated to open or close the shutters F.

H are receptacles for the pictures—one for each tube C C' C''—and, as shown, the receptacles for the tubes C C' are continuous, while the receptacle H for the tube C'' has its upper portion left open.

I is a slide of the ordinary construction for carrying a transparent picture and located in the receptacle H of the tube C, and held in position when in the receptacle by springs $h$ in the usual manner. The slide or frame I is slipped into the receptacle H, and the picture which it carries properly focused, after which the slide is not moved. A corresponding slide I is provided for the receptacle H of the tube C', which slide has a central opening I' in line with the center of the tube C' when the slide is adjusted in position, and when adjusted the slide or frame I is held by springs $h$ at the front, as usual, and a top spring $h'$, as shown in Figs. 1 and 15.

J is a secondary slide in the slide I, having two openings J', as shown in Figs. 15 and 16, and having in addition at each end a curtain $j$, by which, when the picture at each opening $j'$ is carried by the opening I', the light will be shut off through such opening I'.

K is a sliding block, on which is mounted the frame or slide J, which block has through its center longitudinally a screw-threaded opening $k$, as shown in Fig. 15.

L is a rod having a screw-thread $l$, which thread is formed by taking a square bar and twisting it to produce the thread effect shown in Fig. 16. The screw-rod L has attached to its projecting end a handle L', and this rod is supported at this end in an ear $i$ on the frame I, as shown in Fig. 16, so as to give the rod a support by which it can be turned to cause the screw $l$ to act and move the frame J forward and back, and have such movement slow and at the same time positive without any liability of stoppage or change in the speed, which speed is governed by the rapidity with which the handle L' is turned.

M is a circular transparent disk, on which are pictures of the design required—such as clouds or a water effect—and this disk has an arbor $m$, projecting out from a hub or center, which arbor at one end is mounted in a support $m'$, attached to the side wall of the receptacle H of the tube C'' by a set-screw $m''$, so that the support can be properly adjusted to set the disk M in the proper manner.

N is a case inclosing a clock-work, by which the arbor $m$ is rotated to revolve the disk M. The clock-work is wound up by a key applied to the stem $n$, in the usual manner for winding clock-work, and the speed at which the disk M revolves can be controlled from the clock-work in any suitable and well-known manner.

O is an adjustable support for the tube C, formed of a post $o$, mounted on the base A', a bracket $o'$, attached to the tube C by screws or otherwise, a spindle $o''$ on the bracket $o'$ and entering the post $o$, and a thumb-screw $o^3$, entering the post $o$ and engaging the stem $o''$. This support O enables the tube C to be raised or lowered, as required, to do which all that is necessary is to unloosen the thumb-screw $o^3$ and adjust the tube C, and then re-engage the thumb-screw $o^3$ with the spindle $o''$.

P is an adjustable support between the tubes C' and C'', formed of a bracket $p$, attached by screws or otherwise to the tube C'', and having a post $p'$, with a screw-threaded stem $p''$, which enters a thumb-nut $p^3$ on a bracket $p^4$, attached to the tube C', so that by turning the thumb-nut $p^3$ the stem $p''$ will be raised or lowered to properly support the tube C'', and a similar adjusting-support can be located between the tubes C and C' for adjusting the tube C'. The support O furnishes a firm bearing for the tube C, and the support P furnishes a firm bearing for the tube C'' and likewise for the tube C', by which the several tubes will be held and maintained in their adjusted position.

Q is a post having a bracket $q$, attached by screws or otherwise to the tube C''', and on which post Q is mounted the case N of the clock-work.

R is the head or block forming the body of the key and having therein a chamber R' and a chamber R'', and having also three plugs $R^3$. Each chamber R' and R'' has leading therefrom on one side three passages $r$, in each of which is the stem of a needle-valve $r'$, having on its end a head $r''$, provided with a series of holes $r^3$ for the insertion of a wire by which the stem can be screwed in or out to properly adjust the needle-valve, and each stem at its screw-threaded portion passes through a projection $r^4$, having a screw-threaded hole for the stem and a screw-thread on its exterior to receive a packing-box $r^5$, by means of which and suitable packing $r^6$ a tight joint is formed around the stem of the needle-valve. Each plug $R^3$ has a handle $r^7$ at one end by which the plug can be turned, and the opposite end is held in place by a ring $r^8$ and a set-screw $r^9$, and each plug $R^3$ is of a tapering shape, as shown in Fig. 11.

S is the tube for the oxygen gas, and S' the tube for the hydrogen gas, and the oxygen gas flows into the chamber R' and the hydrogen gas flows into the chamber R''. Each tube S and S' is attached by a coupling $s$, which screws onto a plug or projection $s'$ on the end of the head R, through which coupling, and leading into the respective chambers R' and R'', is an opening or passage $s''$, as shown in Fig. 14, and from each passage $r$ a passage $s^3$ leads to the body of each plug $R^3$, and each plug $R^3$ has therein a V-shaped groove $s^4$, one for each passage $s^3$, to line with such passages $s^3$, and through each plug $R^3$ from the groove $s^4$ is a passage $s^5$, which enters a chamber $s^6$ in the face of the plug on the opposite side from the groove $s^4$, as shown in Figs. 12 and 13, and in the body of the key, in alignment with the passage $s^3$, is a passage $s^7$, which extends through a nipple $s^8$ on the face of the head R. It is to be understood that three passages $s^3$ are provided and that two grooves in each key $R^3$ are provided, and that three passages $s^7$ on each side are also provided, so that each plug $R^3$ controls the passages which coincide therewith for controlling the supply of the gas to a light.

T are tubes, one for each nipple $s^8$ on the oxygen-supply side of the key, and T' are tubes, one for each nipple on the hydrogen-supply side of the key, and these tubes T and T' are led into the case A through suitable holes therefor in the end wall $a'$, as shown in Fig. 3, and each tube connects with a tube $t$, which tubes $t$ enter a chamber $t''$, one at each end of such chamber, and in such chamber $t''$ the two gases are brought together and pass out through the jet $t^3$ to project against the lime and produce the light.

U is a clamping-nut formed of a body $u$, having a tapering portion, which body is provided with a series of slots $u'$, as shown in Fig. 10, and on the tapering portion of the body $u$ is a screw-thread which receives a thumb-nut $u''$, by means of which the slot portion can be drawn together or allowed to spring apart, and each nut U is secured to the end wall $a'$ by a head $u^3$ or in any other suitable manner.

V is an adjusting-rod having at its inner end a screw-thread $v'$ and having a longitudinal rib $v''$, which enters a slot $v^3$ in a nut $u$, so that by clamping the nut U down the rod V can be locked.

W are cross-bars connected together by a base or center frame W', on which frame is mounted a secondary frame W'', pivoted to the frame W by a suitable pivot W''' and held at its forward end by a lip $w$, projecting out from the forward cross-bar W, and at the rear end of the frame W' is a projection w', in which is a screw-threaded hole for the screw-threaded end v' of the rod V.

X are rails extending across the case A, fore and aft, one at each side, as shown in Figs. 4, 5, and 6.

Y is a rod passing into the case A from the end wall a' and having on its inner end a bevel-gear y, which meshes with a bevel-gear y' on the stem of the lime-holder, which gears y and y' are inclosed in a stirrup y'' on the end of the rod Y back of the gear y.

Z is a stem carrying at its upper end a lime-holder Z', and the lower end of which is screw-threaded and passes through a nut z, connected with the bevel-gear y', so that by turning such gear the nut z will be turned and the rod or stem Z raised and lowered.

The body A is mounted on the base A' and attached thereto in any suitable manner, and the base is supported by the legs A'', each leg having a stem $a^4$, as shown in Fig. 1, and in use the base and the body A is adjusted so as to stand level or otherwise, as may be required, by raising the base A' and locking the stem $a^4$ of each leg a'' by its set-screw $a^6$, as may be required for the proper adjustment. It will thus be seen that a correct adjustment of the body A can be readily obtained, as all that is required is to unloosen the set-screws $a^6$, by which the stems $a^4$ are locked and held, and then make the necessary adjustment and again lock the stems $a^4$ by the set-screws $a^6$, the result being that the lantern is provided with the necessary means for making any required adjustment without the necessity of obtaining blocks or pieces for that purpose, as has heretofore been required, as each leg A'' carries its own adjusting device.

The tube C, as shown, is firmly attached to the wall a'' by its ring or rim c; but such tube could be attached in the same manner, as shown, for the tubes C' and C'' by the hinges c' and the screws $c^3$ and $c^4$. The tubes C' and C'' are properly adjusted by means of the set-screws c'', $c^3$, and $c^4$, so as to be in alignment with the light and at the proper angle to throw the light on the screen, as required, to produce the effect desired, to do which all that is necessary is to unloosen the set-screw c'' and move the tubes into alignment, and then lock them by turning down the set-screws c'', after which the necessary inclination can be had by turning the set-screws $c^3$ and $c^4$, and the sliding tubes D are adjusted for the proper effect of the lens, either by a thumb-nut d and rack, as shown, for the tube D of the tube C, or in any other suitable manner.

The shutters E are attached to the end of the tubes D by the screws $e^3$, and are properly adjusted to blend the lights by turning the shutters, as required, for the blending effect.

A picture for the lower tube C is inserted in its frame I, and the frame set in the receptacle H for the picture to be projected, as required, on the screen, and such projection is had by opening and closing the shutters F of the tube D through the air-cylinder G, and for this tube the picture to be projected on the screen is one which is to be visible for a moment only, such as a flash of lightning in a thunder storm or in connection with clouds. The pictures of the tube C' are placed in the secondary frame J, and such frame placed in the frame I, which frame is located in the receptacle H of the tube C', so that it can be moved forward and back through the action of the screw stem or rod L, bringing the pictures in front of the opening I' successively, and when the picture has passed the opening the light through the opening I' is shut off by the curtain j until the movement of the frame J is reversed, which again brings the pictures into view.

The glass disk M, with the pictures thereon, is mounted on the arbor m, so as to project into the receptacle H of the tube C'', and the clock-work in the case N is wound up and the disk M made to revolve, bringing the pictures thereon into view to be projected onto the screen.

The picture in the frame I of the tube C remains stationary after it is once inserted, and the pictures in the frame J for the tube C'' are moved forward and back by turning the handle L' to cause the screw L to move the frame J forward and back, and the pictures on the disk M are brought into view automatically by the turning of the disk M through the clock-work, the result being that the operator has only to pay attention to the pictures carried by the frame J and bring them into view at the proper time, which he can do with one hand, while with the other he can operate the shutters F through the air-cylinder G to momentarily flash the picture of the tube C onto the screen at the proper time, thus enabling a single operator to properly handle all of the pictures that are to be projected on the screen and to have perfect control over the projecting of such pictures, bringing them into view at the exact time required and in the order they are to be presented.

The key formed by the head R with the chambers R' R'' and the plugs $R^3$ is one which gives a perfect control over the flow of the gas in connection with the needle-valves r'. The chamber R' is common to all the needle-valves on the oxygen side of the key, and each needle-valve controls a passage r, leading from the chamber R', and the chamber R'' is common to all the needle-valves r' on the hydrogen side of the key, and each valve controls a passage r, leading from the chamber, and a valve r' is provided for each light—that is, if three lights are used three needle-valves are provided for each chamber—and each valve r' is adjusted for the escape of the required amount of gas from the chamber R and R' by opening or closing the valve through the head $r^3$, the opening of the valve $r'$ permitting a greater escape and the closing thereof a less escape, and, if desired, the valves can be closed down, so that no gas can escape; but in practice the valves are adjusted for the escape of gas to the largest quantity required, and the amount of flow of the gas is controlled through the plugs $R^3$. Three plugs $R^3$ are provided, two projecting on one side of the key to receive the handle $r^7$ and one projecting on the opposite side to receive the handle $r^7$, so that the plugs can be operated without interfering one with the other. Each plug $R^3$ has in its face two V-shaped grooves $s^4$, which grooves start on each side flush with the face of the plug and are deeper at the center, as shown in Figs. 12 and 13, so that by turning the plug, as shown in Fig. 13, the flow of gas through the passage $s^3$ from the passage $r$ is entirely shut off, and by turning the plug around, as shown in Fig. 12, the gas can flow from the passage $r$ into the passage $s^3$, thence into the groove $s^4$, through the passage $s^5$ into the chamber $s^6$, out through the passage $s^7$ into the tube T or T', and thence through the tubes $t$ into the chamber $t''$, where they are commingled to pass onto the jet $t^3$ and be projected into the line. The plug $R^3$ can be turned so as to leave only a slight opening at the passage $s^3$ for the gas to enter into the groove $s^4$, or the plug can be turned to furnish a larger space at the groove $s^4$ for the flow of the gas, the result being that the amount of gas allowed to pass is governed by the turning of the plug $R^3$, and also the flow of the gas can be entirely stopped by turning the plug to the position shown in Fig. 13, the result being that the flow of the gas is entirely controlled by the plugs $R^3$, so that the full pressure can be left on, and no change need be made in the needle-valves after they are once adjusted, as the pressure will be on the plugs, where it should be, and not on the needle-valves.

The oxygen and hydrogen gases are supplied from cylinders, as usual, through the pipes S and S', respectively, and flow through the pipes or tubes S and S' into the chambers R' and R'', when the plugs $R^3$ are turned to permit the gas to pass through and enter the tubes T and T'. The plugs $R^3$ give a perfect control over the gas in connection with the needle-valves, and such control is positive, as all that is required to shut off the flow is to turn the plug to the position shown in Fig. 13, while to give any required flow the plug $R^3$ is turned to give the necessary opening for the flow through the slot $s^4$, the result being that the plugs control the flow of the gas and enable the operator to gage his light, as may be desired, by simply turning the plugs without touching the needle-valves.

The cross-bars W, carrying the frame supporting the lime-holder, are adjusted on the track X through the rod B, and when a quick adjustment is desired the clamping-nut U is unloosened by turning back the thumb-nut $u''$, so that the rod V is free to slide forward and back in the nut U; but when a nice and accurate adjustment of the lime is required the nut U is made to clamp the rod V by turning the thumb-nut $u''$ onto the body $u$ and cause such body to tightly clamp the rod V, which permits the rod to be turned by the turning of the nut U in the end wall $a'$, and such turning of the rod V will, through the screw-threaded end $v'$ and projection $u'$, move the bars W forward and back on the track X accordingly as the rod V is turned, and as such movement is through the action of the screw-thread on the end $v'$ it will be seen that the adjustment can be very slight, and to the exact degree required.

The lime carried by the holder Z' is turned through the rod Y and the bevel-gears $y$ and $y'$ by simply turning the rod Y from the outside of the case A, and in order to insure the turning of the rod or stem C with the gear $y'$ such rod has a spline or rib by which it is locked to the gear, and the rod Z is raised and lowered by means of the gears $y$ and $y'$ and the nut $z$, so that the entire adjustment of the lime is had from the outside of the case.

The tubes $t'$ and the chamber $t''$, with the jet $t^3$, are supported by the cross-rods $w^3$, attached to the casing of the chamber $t''$ and running back through a block Z'', through which the rod or stem Z passes into a head or block Y'', having therein a screw-threaded opening to receive the stem of a screw Y', having a head which rests on the bar $w^4$, supported by posts $w^5$, extending up from the frame or support W'', on which bars $w^5$ the head Y'' is free to slide, and the turning of the screw Y' raises and lowers the block Y'', carrying with it the rods $w^3$ to raise and lower the tube $t'$, chamber $t''$, and jet $t^3$, which raising and lowering is required accordingly as the lime is fresh and of full length, or has been partially burned. It will thus be seen that both the lime-holder and the jet are adjustable up and down, enabling the proper position to be had for the action of the gas on the lime. The lime-holder is moved to or from the jet by means of a stem $z'$, connected with the block Z'' and running back through the block Y'', which stem can be screw-threaded, if so desired, in which case the hole therefor in the head or block Y'' is likewise screw-threaded.

The frame W'' is turned on its pivot $w''$ by a rod or stem X', the inner end of which is screw-threaded and enters an ear $x$ on the end of the frame W'' and the outer end of which is supported by a bearing $x'$ on the cross-bar W, as shown in Fig. 6, so that by turning the stem either one way or the other the frame W'' can be turned to either side, as required, to bring the jet in proper center with the light-opening.

The heat and products of combustion should be carried to the back of the lantern in order to keep the effects thereof away from the lenses, and this is accomplished by placing a shield 1 over the lower jet, which shield runs to one side. This shield is attached to the body of the lantern on the door side thereof and runs across the body to the opposite side, and is then carried up to near the body of the lantern, forming a passage 2 between the shield and the side of the lantern, as shown in Fig. 5. A similar shield 3 is provided for the middle jet, likewise attached to the door side of the body and extending across the body, and thence up to near the top of the lantern, forming a passage 4 between the shield 3 and the shield 2, as shown in Fig. 5, and at the top of the lantern is a hinged door or flap 5, which can be opened up, as shown in Fig. 5, to allow the heat and hot air to escape, and additional escape for the heat and hot air is provided for by openings 6, formed in the side of the lantern-body adjacent to the passage 2, as likewise shown in Fig. 5. The flap or door 5 being hinged, can be readily thrown up to allow the heat and air to escape, and when the lantern is not in use this door can be closed down, so as to form in effect a continuation of the lantern-top. The shields 1 and 3 each act to deflect the heat and hot air back and to one side of the lantern, thereby preventing their escape at the front to an extent to injure the lenses, the result being that the front of the lantern and the lenses are kept reasonably cool.

The operation of the lantern as a whole will be readily understood from the foregoing description; but, briefly, is as follows: The pictures for the required representation are set in the receptacles H of the respective tubes C C' C'', and the tubes are adjusted as required for the display, and the shutters of the tubes C' C'' adjusted so as to properly blend and produce a horizon or other effect. The lime-holders and jets are each adjusted for the gas to properly act on the lime, and the plugs $R^3$ of the key are manipulated to give the required degree of light for the effect required for the different pictures, and the pictures are projected on the screen by the operator moving the frame J and operating the shutters F, when the pictures on the disk M will be automatically presented.

The production of the proper scenic effects in displaying three transparencies requires in many cases that the reflection shall be thrown on the transparency at an angle, and with a circular lens the circle produced will be in the form of an oval, by which some portion or parts of the picture will vanish before the time required, producing bad effects, and it is for the purpose of remedying the defects belonging to the throwing of the pictures on the screen at an angle that the shutters are necessary, as by setting the shutters at different angles in relation to each other the light can be thrown onto the screen in the form of a square or an oblong with square ends and top and bottom, or such other shape as may be required to produce the proper effect from the pictures, and this feature of adjustable shutters to cut the light and produce the required display-space on the screen forms an essential feature of the invention.

What I claim as new, and desire to secure by Letters Patent, is—

1. A lens-tube having a receptacle for a picture-slide, in combination with a hinge and adjusting-screws, for attaching the tube to the body of the lantern in an adjustable manner, substantially as and for the purpose specified.

2. The combination, with the lens-tube of a stereopticon, of the hinge $c'$, set-screw $c''$, adjusting-screw $c^3$, and bearing-screws $c^4$ for attaching the tube to the lantern-body, substantially as and for the purpose specified.

3. The combination, with the lens-tube of a lantern, of an adjustable shutter having a straight defining edge cutting the face of the lens in a straight line, substantially as and for the purposes set forth.

4. The combination, with the lens-tube of a lantern, of a series of adjustable shutters, each having a straight defining edge cutting the lens in a straight plane and located on the front end of the tube for projecting the illumination in a straight line, substantially as specified.

5. The combination, with the tube D, of the shutters E, each having a body $e$, with an ear $e'$, having a slot $e''$, and attached by a set-screw $e^3$, substantially as and for the purpose specified.

6. The combination, with a slide or frame carrying pictures to be displayed, of a head having a screw-threaded hole and a screw-threaded rod coacting with the head for moving the frame with steadiness and precision, substantially as and for the purposes specified.

7. The frame I, having the opening I', frame J, having the openings J', and block K, having a longitudinal screw-threaded hole, in combination with the screw-threaded rod L, substantially as and for the purpose specified.

8. The receptacle H, frame I, having the opening I', frame J, having the openings J', and curtains $j$, in combination with the head or block K, having a longitudinal screw-threaded hole and screw-threaded rod L, substantially as and for the purpose specified.

9. The combination, with the lens-tube of a lantern, of a revolving transparent disk having an unbroken surface with display-pictures, substantially as and for the purpose specified.

10. The receptacle H, in combination with the transparent disk M, having an unbroken surface with the display-pictures thereon, and a clock-work for revolving the disk M, substantially as and for the purposes specified.

11. The combination, in a lantern, of a lens-tube with a stationary picture mounted therein, a lens-tube with a movable picture mounted therein, and a lens-tube with a revolving picture mounted therein for producing different scenic effects at the same time and on the same screen, substantially as and for the purposes specified.

12. The combination, in a lantern, of a lens-tube having a stationary picture and provided with shutters adapted to be opened and closed quickly, a lens-tube with a movable picture and having adjustable shutters at its outer end, and a lens-tube having a revolving picture with adjustable shutters at its outer end for displaying the several pictures upon one screen simultaneously, substantially as and for the purposes specified.

13. The base A' and tube C, in combination with the adjustable support O, consisting of the post $o$, attached to the base A', bracket $o'$, attached to the tube C, spindle $o''$ on the bracket $o'$, entering the post $o$, and set-screws $o^3$, substantially as and for the purposes specified.

14. The tubes C' and C'', in combination with the adjustable support P, consisting of a bracket $p$, attached to the tube C'', a post $p'$, with a screw-threaded stem $p''$ on the bracket $p$, a thumb-nut $p^3$ on the stem $p''$, and a bracket $p^4$, attached to the tube C', substantially as and for the purposes specified.

15. The combination, with a hinged lens-tube of a lantern, of an adjusting device at the forward end of the lens-tube for supporting the tube and changing its vertical position, substantially as and for the purposes specified.

16. The combination, with two hinged lens-tubes of a lantern, of an adjustable support forming a connection between the two tubes and for changing the vertical position of the outer ends of the tubes, substantially as and for the purposes specified.

17. The combination, with two hinged lens-tubes of a lantern, of an adjusting-screw connecting the two tubes at their forward ends and furnishing a support and vertical adjustment for the forward ends of the tubes, substantially as and for the purposes specified.

18. A key for a lantern, consisting of a head or body having chambers for the gases, needle-valves for controlling the flow from the chambers, and a plug-valve for controlling the flow to the jet, substantially as and for the purpose specified.

19. The head R, having the chambers R' R'', passages $r$, and needle-valves $r'$, in combination with the plug-valve $R^3$, having the grooves $s^4$, passages $s^5$, chamber $s^6$, passage $s^3$, and passage $s^7$, for controlling the flow of the gases to the jet, substantially as and for the purpose specified.

20. The heads R, having chambers R' and R'', passage $r$, needle-valves $r'$, plug-valve $R^3$, with grooves $s^4$, passages $s^5$, and chambers $s^6$, passages $s^3$, and passages $s^7$, in combination with the supply-tubes S and S', substantially as and for the purposes specified.

21. The head R, having the chambers R' and R'', passages $r$, needle-valve $r'$, plug-valve $R^3$, with grooves $s^4$, passages $s^5$, chambers $s^6$, passages $s^3$, and passages $s^7$, in combination with a supply-tube S and S' and conducting-tubes T and T', substantially as and for the purposes specified.

22. A key for a lantern formed of a head having therein two chambers for the gases, a series of passages leading from each chamber, a needle-valve for each passage, a series of plug-valves each having grooves, passages, and chambers, and escape-passages controlled by the plug-valves, substantially as and for the purposes specified.

23. The head R, having the chambers R' and R'', a series of passages $r$, leading from each chamber R' and R'', and a needle-valve $r'$ for each passage $r$, in combination with a series of plug-valves $R^3$, each having grooves $s^4$, passages $s^5$, and chambers $s^6$, and escape-passages controlled by the plug-valves, substantially as and for the purposes specified.

24. The clamping-nut U, having the slotted body $u$ and adjusting-nut $u''$, in combination with the rod V, connected with the carriage or frame carrying the jet and lime for adjusting the carriage or frame, substantially as specified.

25. The clamping-nut U, having the slotted body $u$ and adjusting-nut $u''$, in combination with the rod V, having the screw-threaded end V' and spline $v''$, and the projection $v'$ on the carriage or frame for the lime and jet, substantially as and for the purposes specified.

26. The cross-bars W and frame or support W', in combination with the pivoted support or frame W'', carrying the lime-holder and the jet, and an adjusting-screw for the frame W'' for changing the position of the lime and jet sidewise, substantially as specified.

27. The rod Y, bevel-gear $y$, and bevel-gear $y'$, in combination with the stem Z and lime-holder Z' for turning the lime-holder as the lime burns away, substantially as specified.

28. The stem Z, head Z'', and rods $w^3$, in combination with the head Y'' and stem $z'$ for moving the line-holder to and from the jet, substantially as specified.

29. The tube $t'$, chamber $t''$, and jet $t^3$, in combination with the bars $w^3$, head Z'', head Y'', and adjusting-screw Y' for raising and lowering the jet in its relation to the lime-holder, substantially as specified.

30. The combination, with the body of a lantern, of a series of shields located above the jets and running to one side of the lantern and passages formed by the shields leading to the top of the lantern, and an escape-opening at the top of the lantern, substantially as and for the purposes specified.

LYMAN D. McINTOSH.

Witnesses:
  O. W. BOND,
  C. ALFRED SMITH.